US007431556B2

United States Patent
Campioli et al.

(10) Patent No.: US 7,431,556 B2
(45) Date of Patent: Oct. 7, 2008

(54) STACKING DEVICE FOR HOLLOW STACKABLE OBJECTS ON EXIT FROM A ROTATING HIGH-SPEED PRODUCTION MACHINE

(75) Inventors: Milo Campioli, Reggio Emilia (IT); Massimo Verona, Reggio Emilia (IT)

(73) Assignee: O.M.S.O. S.p.A., Reggio Emilia (IT)

( * ) Notice: Subject to any disclaimer, the term of this patent is extended or adjusted under 35 U.S.C. 154(b) by 243 days.

(21) Appl. No.: 11/134,454

(22) Filed: May 23, 2005

(65) Prior Publication Data
US 2005/0263952 A1   Dec. 1, 2005

(30) Foreign Application Priority Data
Jun. 1, 2004   (IT)   ........................... RE2004A0067

(51) Int. Cl.
B65B 35/50   (2006.01)
B65G 57/16   (2006.01)
B65G 15/10   (2006.01)

(52) U.S. Cl. ................. 414/788.2; 414/792.9; 414/795; 198/817; 198/803.12; 198/419.2

(58) Field of Classification Search .............. 414/788.2, 414/788.3, 795.3; 198/468.01, 415, 418, 198/418.5, 817, 468.2, 468.3, 468.8, 412, 198/438; 406/78; 425/402, 388, 393; 101/40
See application file for complete search history.

(56) References Cited

U.S. PATENT DOCUMENTS 3,389,811 A * 6/1968 Frank ........................... 73/45.3
3,587,816 A * 6/1971 Russell et al. ............. 198/464.4
3,661,282 A * 5/1972 Buhayar et al. ............. 414/800
3,709,349 A * 1/1973 Buhayar et al. .......... 198/468.4
4,142,345 A * 3/1979 Porter, Jr. ........................ 53/54

FOREIGN PATENT DOCUMENTS

CH       609 947         3/1979
DE    42 24 945 A1       2/1994
EP       49963 A    *    4/1982

OTHER PUBLICATIONS

Abstract of Japanese Patent Publication No. 58109324 for Collecting Method and Device of Vessel After Forming to Toyofuku Hidekazu; Published Jun. 29, 1983.

* cited by examiner

Primary Examiner—Gregory W Adams
(74) Attorney, Agent, or Firm—Browdy & Neimark, P.L.L.C.

(57) ABSTRACT

The device serves for stacking hollow objects generally tapered and intended for accumulation in stacks where they are arranged, each one partially inserted in the next. The stacking device operates at the exit of a rotating machine (20) operating at high speed, and having a rotating head (21) for the single objects, and comprise an extractor means (30) located in an exit station (B) of the rotating machine (20) intended to remove the objects from the rotating head (21) one at a time. According to the invention, an intermediate stacking means (40) is foreseen, fed at its entry point with objects introduced by means of the extractor means (30) with a movement parallel to the axis (R) of the objects in question, said intermediate stacking means (40) being adapted to grip the objects in the position in which they are received from the extractor means (30) and to send them in a longitudinal direction parallel to their axis (R) and at such a speed that, in relation to the feeding speed of the objects in question at the entry, the objects are accumulated in a partial manner, while maintaining a distance that prevents any substantial contact between the side walls (11) of the objects.

6 Claims, 6 Drawing Sheets

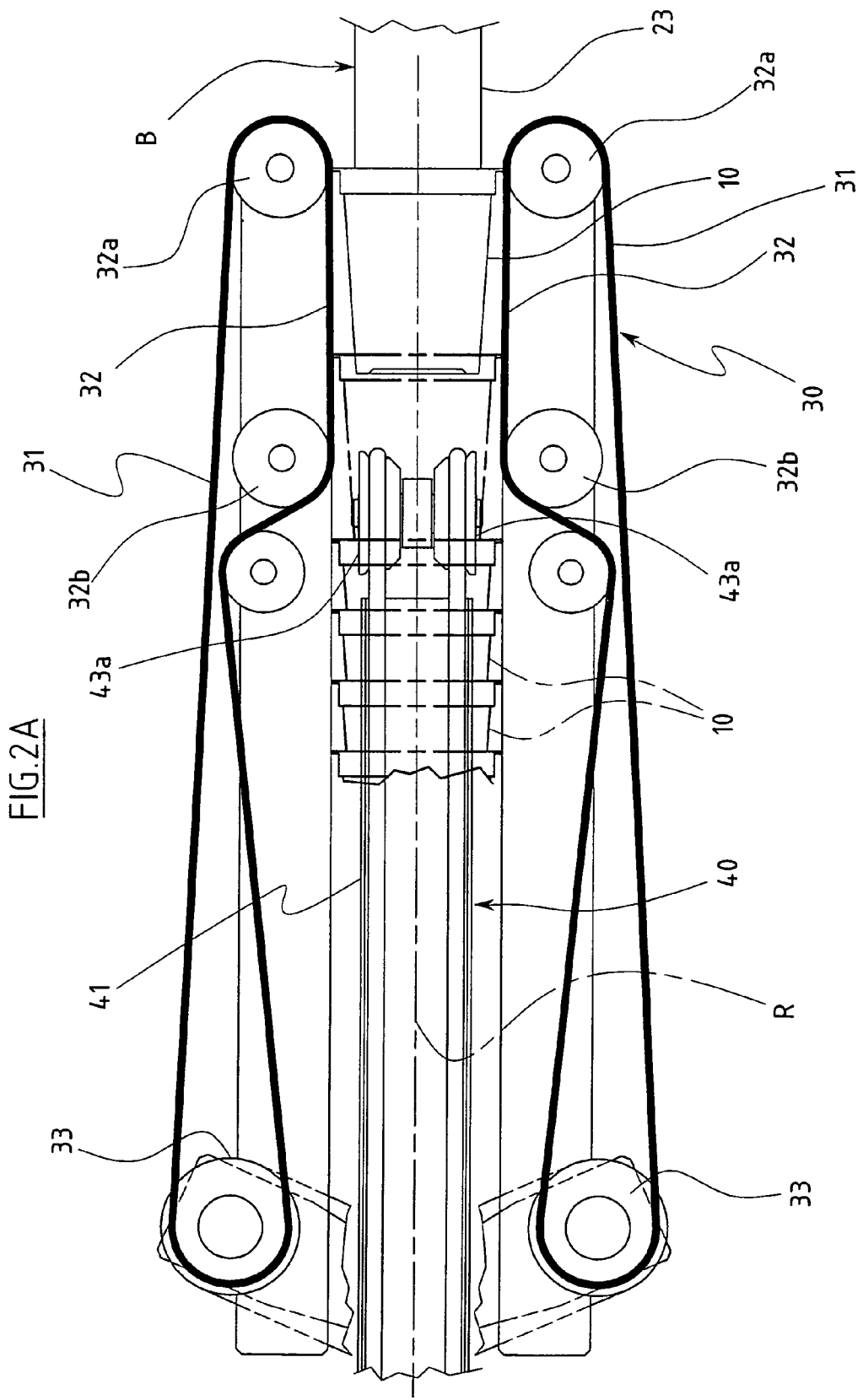

STACKING DEVICE FOR HOLLOW STACKABLE OBJECTS ON EXIT FROM A ROTATING HIGH-SPEED PRODUCTION MACHINE

BACKGROUND OF THE INVENTION

Technical Field of the Invention

The present invention relates to a stacking device for hollow stackable objects, said objects being hollow and of a generally tapered form, adapted for stacking, arranged so that one object is partially inserted inside the next, said device operating at the exit of a rotating machine operating at high speed (producing approximately one hundred processed objects per minute) comprising a rotating head bearing the single objects.

A typical, but by no means exclusive application is for small beaker-shaped containers, basically of a frustoconical form, made in a polymeric material, and the machine on which the invention is applied, is a rotating decorating machine adapted to decorate said objects at a speed of approximately one hundred per minute.

At the present time, in the exit station of such decorating machines is placed a stacking device having an extracting means adapted to remove the objects one at a time from the rotating head, and to launch them according to the axis of the travel direction, one after the other in a fixed corridor defining an accumulation area where the objects are inserted one inside the other in a compact and complete manner, or in other words, with the side walls in reciprocal adherent contact.

From the portion downstream of the accumulation area, stacks of objects in a pre-defined number are drawn to be dispatched for the following operations.

Technical problems arise in the accumulation area because of the reciprocal approach and insertion of the objects as this action occurs with a certain degree of rubbing between the surfaces of the side walls which are in contact with each other. Therefore there exists a serious danger that the decorations may become damaged, in this way compromising the external appearance of the object in a manner that is unacceptable; furthermore particles that detach, remaining inside the adjacent beaker, damage the substance that is placed inside the beaker itself further on, especially in the case of food products.

One aim of the present invention is to eliminate said problems.

OBJECT AND SUMMARY OF THE INVENTION

The invention is characterised by the fact that it comprises an intermediate accumulation means, fed at its entry with the objects moved by the extracting means in a movement parallel to the axis of the objects in question, said intermediate accumulator means being adapted to maintain the objects in the position in which they are received from the extracting means and to send them in a longitudinal direction parallel to the axis of the objects, and at a such a speed that in relation to the feeding speed of the objects in question, said objects are partially accumulated, and are maintained at such a distance to prevent any substantial contact between the side walls of the objects.

This and other aims are achieved by the present invention.

BRIEF DESCRIPTION OF THE DRAWINGS

The invention will be described in detail below, with the help of the appended figures which illustrate an embodiment as an example but that is by no means exclusive.

FIG. 2A in an enlarged detail of FIG. 2, in a simplified version to demonstrate more clearly the manipulation of the objects in the intermediate accumulator means and downstream of said means.

DETAILED DESCRIPTION OF THE PREFERRED EMBODIMENT(S) OF THE INVENTION

Figure 4:
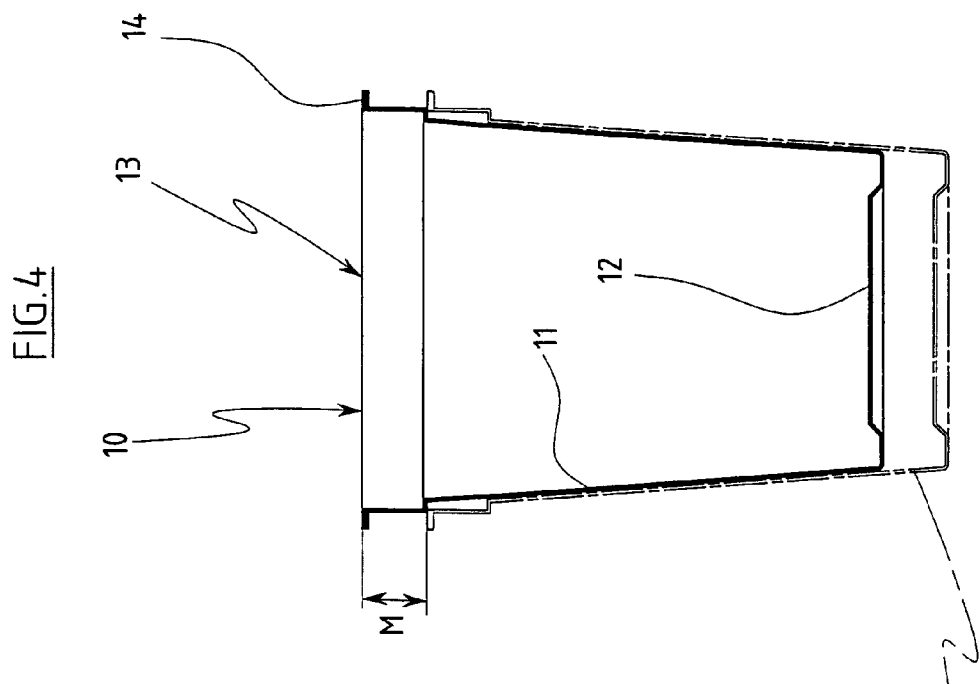
FIG. 4 is the enlarged axial section of an object manipulated by the stacking device illustrated in the figures.
Figure 3:
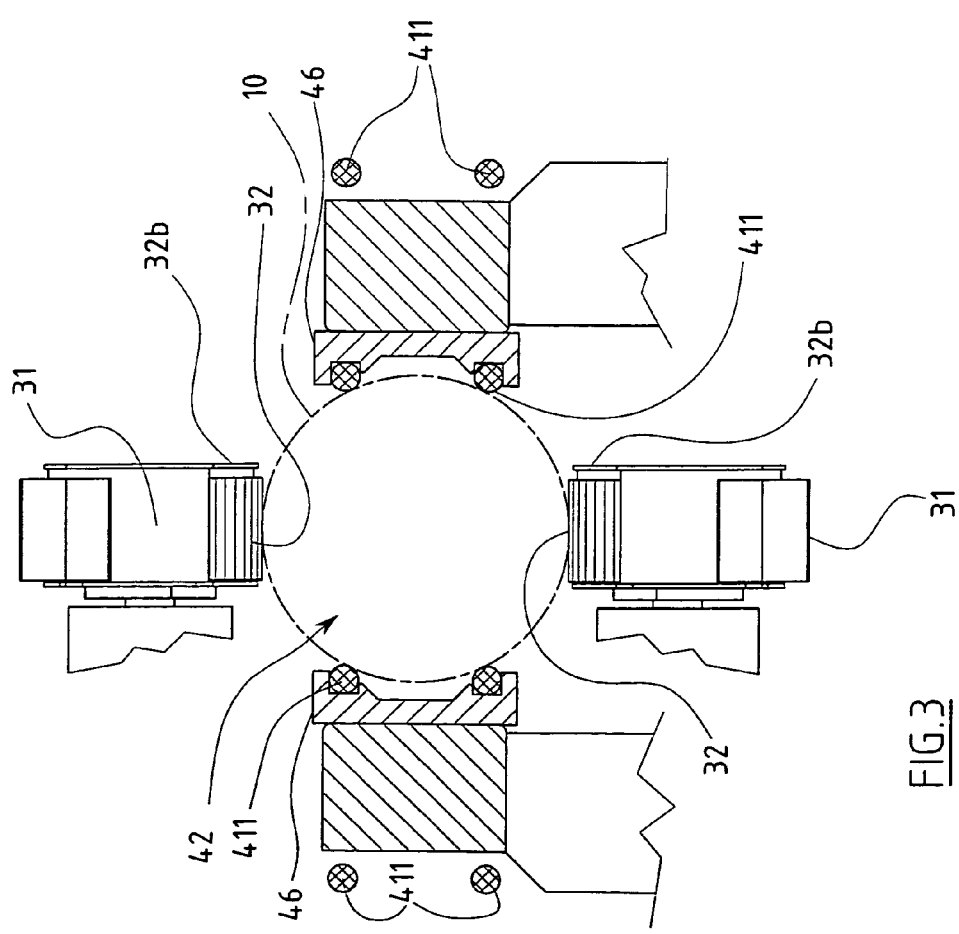
FIG. 3 is the section according to line III-III in FIG. 2.

FIG. 4 shows an enlargement of an example of the type of object manipulated by the stacking device shown in all figures. In this example, it concerns a recipient (indicated throughout by the numeral 10) having the form of an overall frustoconical beaker shape, with a side wall 11 in the form of a rotation surface, and a bottom wall 12, circular in form that closes the smallest base. On the other hand, the greatest base is open and defines the upper mouth 13 of the beaker; the rim of said mouth 13 presents a fine circular lip 14 that protrudes slightly (shown in detail in FIG. 4).

Generally speaking the form of the objects 10 permits them to be stacked in piles where they are inserted partially inside one another; they are reciprocally inserted until the internal surface of the side wall 11 of the external object 10 (shown by a dotted line in FIG. 4) is substantially in close contact for a considerable distance with the external surface of the side wall 11 of the internal object 10 (shown by a continuous line in FIG. 4).

In the figures, the continuous operating machine on which the stacking device according to the present invention is applied, is a rotating decorating machine (indicated throughout by the numeral 20) per se known. In the illustrated embodiment (provided as an example) the machine 20 comprises a head 21 that rotates around a central shaft 22 with a horizontal axis, in turn comprising a plurality (in the figures, eight in number) of chucks 23 intended to bear the same number of single objects 10 oriented with their axis placed in a radial manner around shaft 22.

Figure 1:
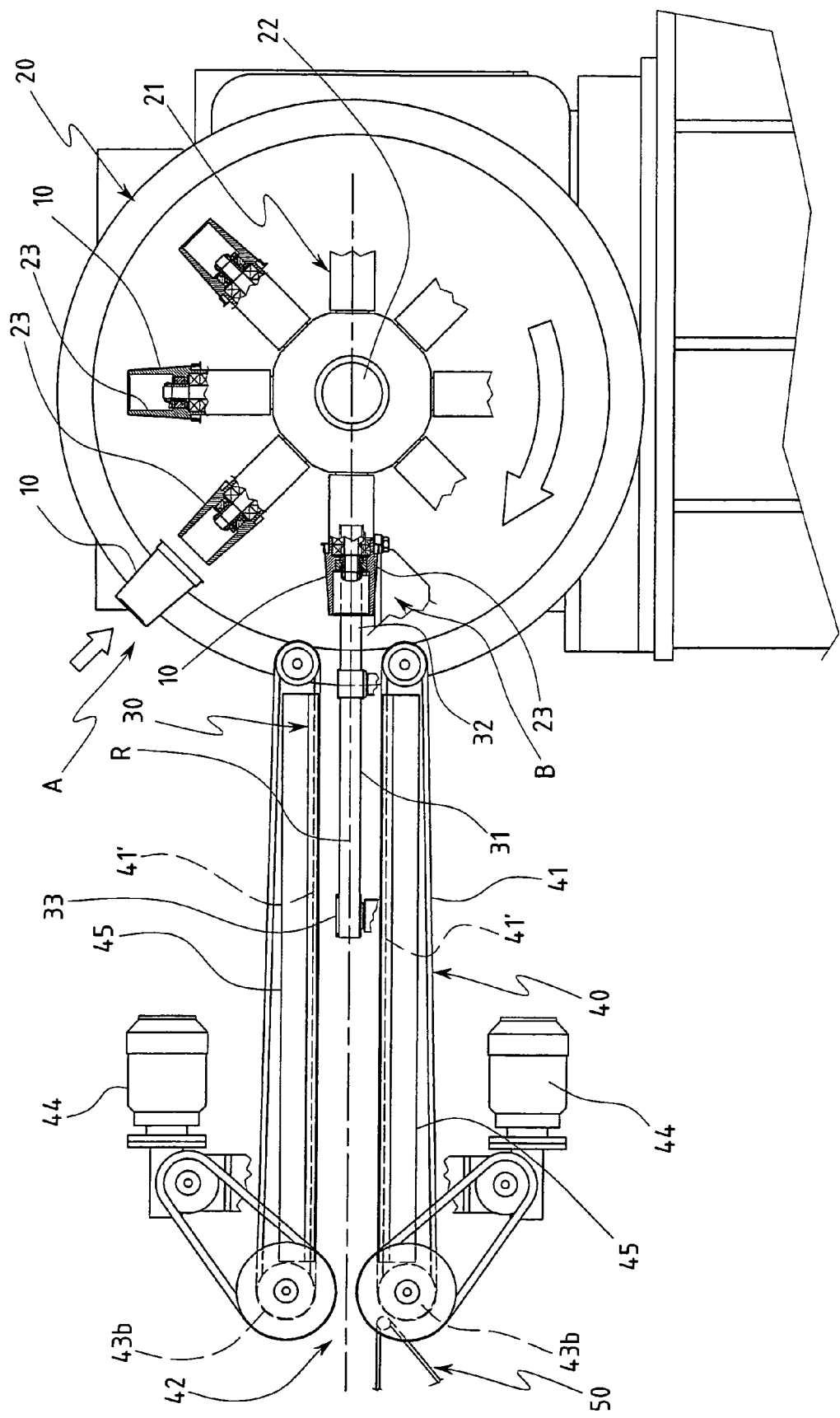
FIG. 1 is a side vertical elevation view of the stacking device in question, applied to a rotating decorating machine (the objects 10 placed in the intermediate accumulator means 40 and in the final accumulator means 50 are not illustrated in the figure for greater clarity).

On the left hand side of the head 21, shown in FIG. 1, is located the feeding station A in which the objects are applied to the chucks 23 using known means and methods not illustrated.

After a round angle of approximately 300 degrees in a clockwise direction is located station B for the exit of the objects from head 21. This station B is positioned on the left hand side of the straight horizontal line R that passes through the shaft 22, and is perpendicular thereto and is directed in the same direction as the line R itself.

At the exit station B is an extractor means 30 intended to remove the objects 10 one at a time from the chuck 23 each time it moves into position in station B.

More precisely, said extractor means 30 comprises two conveyor belts 31, arranged at a certain distance from each other in a specular and symmetrical manner in relation to the vertical plane that passes through line R. Each of said belts 31 has an active section 32 that travels between two return wheels 32a and 32b shown in FIG. 2A, and parallel to said vertical plane passing through line R. For the rest of the section, each belt 31 is wound around a transmission wheel 33 driven by its respective motor.

The two active sections 32 are positioned at a reciprocal distance basically equal to the maximum diameter of mouth 13 of the objects 10. Preferably on the active surface of the belts 31 are numerous ridges 34 shown in FIG. 1B protruding in a perpendicular direction, and distributed in succession along the total length of the belts themselves in order to better grip the mouth 13 of the objects by urging against the lip 14 of the object.

According to the invention, an intermediate accumulator means 40 is foreseen and fed at its entry with objects 10 introduced by the extractor means 30 in a movement parallel to line R and the axis of the objects in question.

Figure 1A:
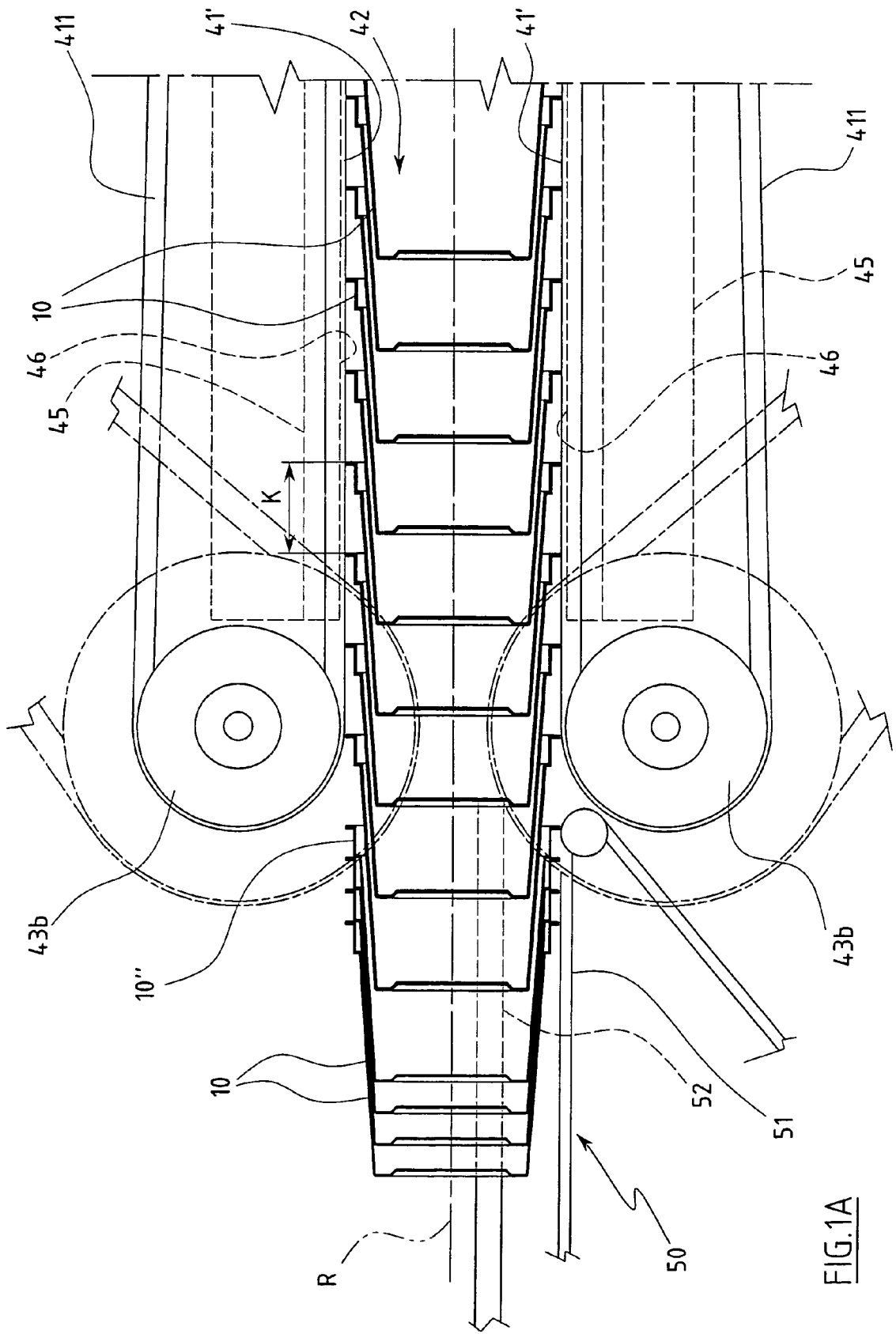
FIGS. 1A and 1B show an enlarged view of the downstream end and upstream end of the intermediate accumulator means 40 respectively.
Figure 1B:
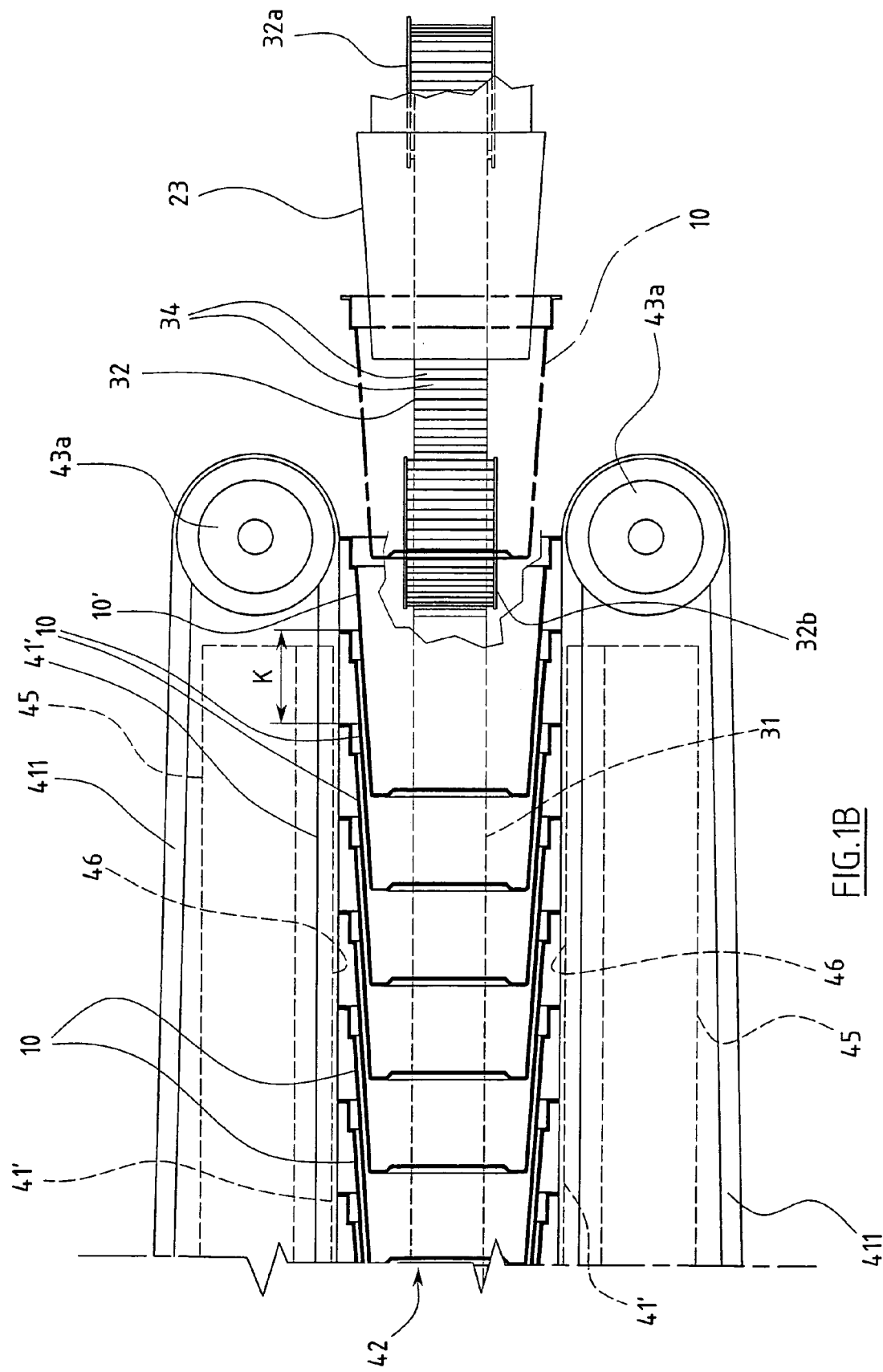
Figure 2:
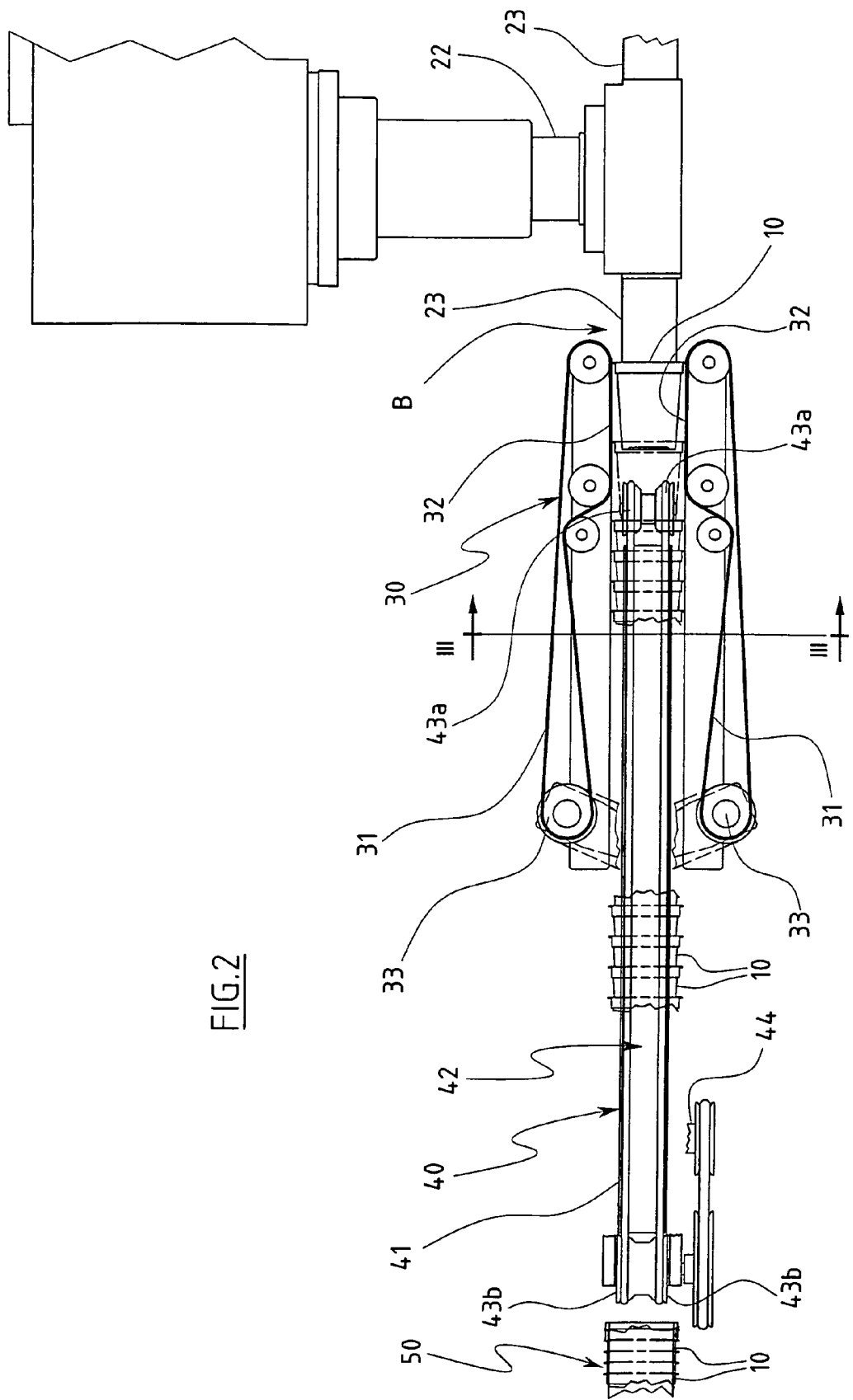
FIG. 2 is a plan view seen from above.

As seen in FIG. 2, the chucks 23 of rotating machine 20, the axes (R) of the cups 10 on the chucks 23 and in the intermediate accumulator means 40, and the intermediate accumulator 40 itself, all lie in the same plane. Whereas, as shown in FIGS. 1B and 2A, the extractor means 30 lies in a plane intersecting and perpendicular to the plane in which the chucks 23, axes of the cups 10, etc. lie.

Said intermediate accumulator means 40 comprises a pair of linear conveyor elements 41, parallel and opposite each other, whose active sections 41' travel along a longitudinal path developed parallel to the axis of the objects (line R), and which define the two opposite walls of a corridor 42, which walls are then in continuous movement and are intended to grip with a thrusting action in a transversal direction, the objects 10, maintaining them in the position in which they are received from the extractor means 30.

In particular, said walls of corridor 42 defined by sections 41' are positioned at a reciprocal distance in a manner so that each object 10 is able to be inserted into corridor 42 in contact with both said sections 41', adapted to grip the objects individually by means of opposite and transversal thrust action.

According to a preferred embodiment (but not exclusive) of this system, said linear conveyor elements 41 each comprise at least one and preferably two conveyor belts 411, longitudinal, elongated, having a circular section in particular, adapted to each define a point of contact with the object.

More precisely, each linear conveyor element 41 comprises two belts 411 which wind around two pairs of end pulleys 43a and 43b supported by a longitudinal member 45; the active sections of the belts 411 run in longitudinal guides 46 supported by the longitudinal member 45. Furthermore, the two pulleys 43b of the same linear conveyor element 41 are integral to each other and the two pairs of pulleys 43b are motor driven by a respective speed reducer 44. The active sections of the four belts 411 are developed in a direction parallel to the line R. While the two belts 31 of the extractor means 30 are positioned on the horizontal plane passing along line R, the two active sections 41' of the conveyor elements 41 are positioned on the vertical plane passing along line R.

Downstream of the intermediate accumulator means 40 is positioned a final accumulator means 50, fed at the entry with the objects moved by the intermediate accumulator means 40.

In particular, said accumulator means 50 is composed of a conveyor belt 51, possibly assisted by fixed longitudinal side walls 52, adapted to convey the objects in a longitudinal direction parallel with the axis of said walls (coinciding with line R) and at a speed that is slower than that of the intermediate accumulator means 40 in such a manner to ensure that the objects which are already partially inserted inside one another, will penetrate inside each other even further. The decorating machine 20 operates by rotating in a clockwise direction in step motion.

The objects are loaded onto the head 21 in station A; while they travel along a successive round angle section decorative elements are applied to the external surface of the object; while they travel along a further successive round angle section the decorative elements are subjected to a rapid drying action; lastly, when the object reaches station B it is extracted from the respective chuck 23 by the extractor 30 which moves it in the direction of line R, launching it towards the initial end of corridor 42.

The object 10 is gripped by the end of the entry to corridor 42 and forced to travel at a speed that, compared to the speed at which the objects 10 are fed into the entry, ensures that the objects accumulate without becoming inserted inside each other to a maximum degree, but only partially, maintaining them at a distance that prevents substantial contact between the side walls of the objects.

In order to clarify this characteristic further, let it be supposed that if the value M equals the distance between two same points between two objects 10 wherein one is completely inserted inside the other, for example the distance between the upper rims of the lips 14 (visible in FIG. 4), the objects 10 would result as completely inserted inside each other, if in the interval that occurs between the exit of an object 10 from the head 21 in station B and the exit of the following object (corresponding to the interval required by head 21 to move one step, which in the case illustrated in the figures, is equal to one eighth of a round angle) the objects 10 placed in corridor 42 would travel the distance M.

However, according to the invention, the travel speed of corridor 42 is such that the objects 10 placed in the corridor itself move during said interval a distance K which is considerably greater than M, so that when the object extracted from the chuck 23 placed in station B reaches the initial end of corridor 42 (in this position the object is identified by numeral 10' in FIG. 1A) the last object belonging to the accumulated stack in the corridor itself is at a distance that is greater than M, as stated previously. Therefore the objects 10 placed in corridor 42 are maintained at a reciprocal distance K greater than M, and are therefore inserted into each other only partially, and above all, without the side walls 11 making any strong contact with each other. This prevents reciprocal rubbing between such walls as required.

Each object 10 then gradually travels from corridor 42 carried by the conveyor belt 51 that moves the stack of objects placed thereon at a speed slower than the travel speed of the intermediate accumulator means 40; the difference between these two speeds is such that the object on exit from corridor 42 is introduced for a greater depth into the last object (10") of the stack placed on the belt 51, and can even be inserted completely therein. In other words, as the stack of objects travels on the belt 51, it is subject to a compacting action until it is compressed to maximum degree.

During the compacting action, rubbing occurs between the side walls 11 of two adjacent objects, however, this rubbing will not be aggressive because the difference between the travel speeds of the two accumulator means 40 and 50 is relatively low, and therefore does not provoke noticeable damage to the material placed on the walls themselves.

Since the linear conveyor elements 41 are arranged one on top of the other, it can occur that the objects 10 placed in corridor 42 tend to roll in the vertical axial plane due to sliding, because of lack of adherence in the contact points between the belts 411 and the objects (lip 14); in this case the axis of the objects rotates in relation to the longitudinal axis of the intermediate accumulator means (that coincides with line R).

In this case it can be foreseen that the speeds of these elements 41 can be regulated differently to create a rotation of the object on the vertical plane passing by the longitudinal axis in order to recover the sliding action of the object in relation to line R.

In the example illustrated in the figures, it can be seen that due to sliding, the objects 10 placed in corridor 42 tend to lower their barycentre after rotation in an anti-clockwise direction in FIG. 1; in this case, by setting the lower conveyor element 41 at a speed slightly higher than that of the upper conveyor element 41, this error can be corrected returning the axis of the objects 10 back to horizontal position.

Naturally numerous modifications of a practical and applicative nature can be applied to the invention (to the finding) while remaining within the context of the inventive finding as described in the following claims.

The invention claimed is:

1. Stacking device for hollow stackable objects, said objects being of a generally tapered form having an axis (R), and stacked so that one object is partially inserted inside the next along said axis (R), said stacking device operating at the exit of a rotating machine (20) operating at high speed and having a rotating head (21) having a plurality of chucks (23) each bearing at least one of the objects, the stacking device comprising extractor apparatus (30) and an intermediate accumulator (40), wherein said chucks, the axis (R) on each of the objects on the plurality of chucks or in the intermediate accumulator, and the intermediate accumulator (40) itself, are all located in a first plane, whereas the extractor apparatus is formed by two opposing and spaced apart first gripping elements located in a second plane intersecting and extending in the longitudinal direction of the intermediate accumulator and perpendicular to the first plane, and operates along said second plane, wherein the first gripping elements are located in an exit station (B) of the rotating machine (20) and grip and remove the objects between the elements from the rotating chucks (23) one at a time, and wherein the intermediate accumulator (40) is fed at an entry thereof with objects introduced by the first gripping elements with a movement in the first plane in the longitudinal direction of the intermediate accumulator, and wherein said intermediate accumulator (40) has second gripping elements in the first plane which partially extend longitudinally between the first gripping elements to grip the objects between the second gripping elements in the position in which they are received from the extracting apparatus (30) and move them in the longitudinal direction of the intermediate accumulator and the axis (R) of the objects engaged in the intermediate accumulator and at such a speed that, in relation to a speed at which the objects are fed into the entry by the extractor apparatus so that the objects are accumulated one within the other in a partial manner within said accumulator, maintaining a sufficient distance to prevent substantial contact between the side walls (11) of the objects when the objects are in a partially inserted configuration in the intermediate accumulator.

2. Device according to claim 1, wherein said second gripping elements define a corridor (42) whose walls are mobile in continuous motion and grip the objects with a transversal thrust action, maintaining them in the position in which they were received from the extractor means (30).

3. Device according to claim 2, wherein said second gripping elements comprise a pair of linear conveyor elements (41) opposite and parallel to each other which partially extend longitudinally between the first gripping elements, whose active sections (41') run in the first plane longitudinally in a longitudinal path and define the two opposite walls of said corridor (42), and are positioned at a reciprocal distance such that each object can be inserted into the corridor (42) in contact with both such sections (41') to grip the objects individually by means of opposite and transversal thrust action.

4. Device according to claim 3, wherein said linear conveyor elements (41) each comprise at least a conveyor belt (411) longitudinal, elongated, to define a point of contact with the object.

5. Device according to claim 1, further comprising a final accumulator (50) fed at its entry with objects moved by the intermediate accumulator (40), to send the objects in a longitudinal direction parallel to the axis (R) and at a speed slower than that of the intermediate accumulator (40) so that the objects already partially inserted inside each other, are compacted to penetrate even further.

6. Device according to claim 3, characterised in that said linear conveyor elements (4) are arranged one on top of the other and that their speeds are different to provoke a rotation of the object on the vertical plane passing in the longitudinal axis (R) in order to recover any sliding made by the object in relation to the linear conveyor elements (41) that can change the axis of the objects in relation to the longitudinal axis (R) of the intermediate accumulator means (4).

* * * * *